March 12, 1935. D. O. NELSON 1,993,976

MILK BOTTLE CARRIER AND ADVERTISING DEVICE

Filed Dec. 8, 1932

INVENTOR
Dwight O. Nelson
BY
Smith & Tuck
ATTORNEYS

Patented Mar. 12, 1935

1,993,976

UNITED STATES PATENT OFFICE 1,993,976

MILK BOTTLE CARRIER AND ADVERTISING DEVICE

Dwight O. Nelson, Tacoma, Wash.

Application December 8, 1932, Serial No. 646,351

3 Claims. (Cl. 215—100)

My present invention relates to the art of carrying handles of the detachable type and more particularly to a milk bottle carrier and advertising device.

Most everyone has experienced the difficulty of endeavoring to carry one or more bottles along with a number of other groceries. This difficulty has been greatly increased recently with the general and wide spread placement of the cash and carry store. It is to provide a convenient means for carrying milk bottles, particularly when filled with milk that I have constructed my present device. I am well aware that many attempts have been made to provide a device of this character in the past, however, these devices, such as have been observed, have been characterized by being either very difficult to apply to a milk bottle or when applied were not secure and many accidents have resulted from the bottles slipping out of position particularly when pressure is released on the handle for a short period and then the bottle again picked up.

Another consideration which has not been brought out previously, it is believed, is those characteristics which aid the distribution of a device. In the present instance, I propose to provide my handle in such a form as to provide an advertising display space to the end that various large firms may sponsor the production and sale of this device and thus create a large distributional organization.

The principal object of my present invention is to provide a milk bottle carrier which is simple and cheaply constructed and which will be dependable at all times.

A further object of my invention is to provide a device which can be easily secured to a milk bottle and which may be just as easily removed.

A further object of my device is to provide a carrying handle of such a character that it will form a satisfactory medium of advertising.

Other and more specific objects will be apparent from the following description taken in connection with the accompanying drawing, wherein Figure 1 is an elevation showing in fragmentary form a milk bottle being carried by one of my handles.

Figure 1:
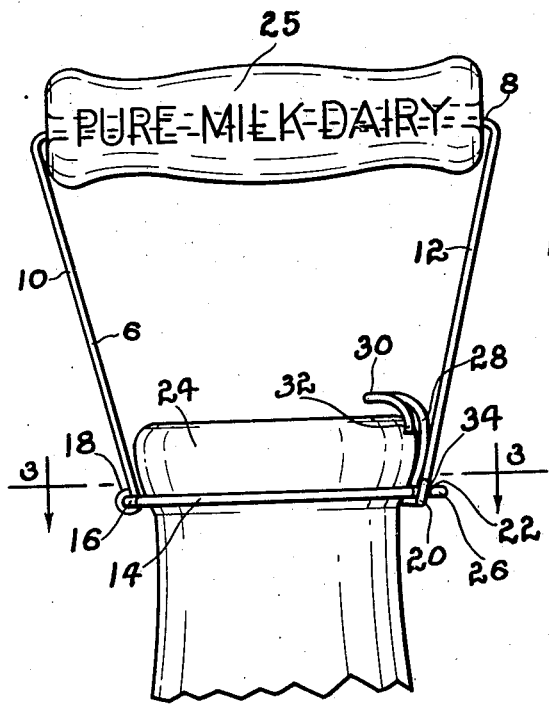
Figure 3:
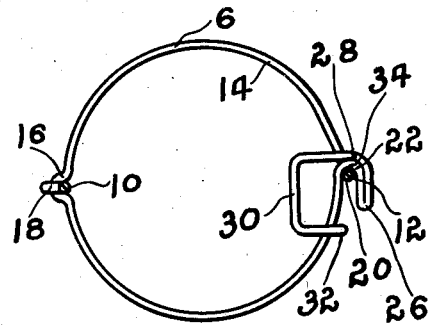
Figure 3 is a sectional view showing only my carrying device as tho cut along the line 3—3 of Figure 1.
Figure 2:
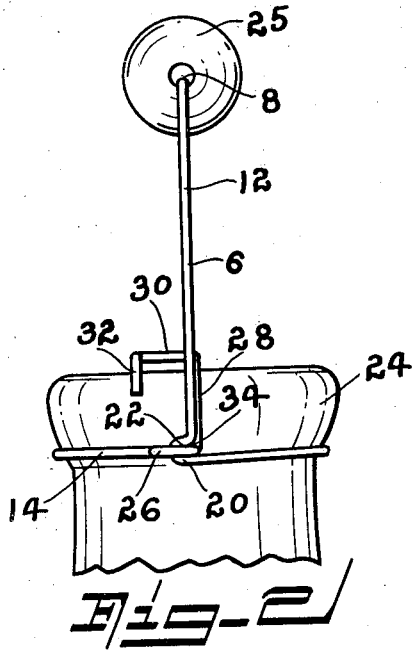
Figure 2 is a side view of Figure 1.

Referring to the drawing, throughout which like reference characters indicate like parts, 6 designates the single wire forming the principal part of my carrier. It is intended that the carrier will be formed from a single piece of wire which will have normally a horizontal portion 8, two side tension members 10 and 12, a curved or circular portion 14 which will be of such a size that the inside diameter will be but slightly larger than the neck of a milk bottle. The circular portion I prefer to bend after the showing of Figure 1 at 16 so that one end of the wire may be secured thereto as at 18 and still have the wire rest snugly against the bottle. A further function of this bend is to center that tension member secured at this point. Leg 12 I prefer to have bent as at 20 so that it will snugly encircle the horizontal circular portion 14 as at 22. This forms a locking arrangement which will normally prevent the carrier from becoming loosened on the neck of the bottle. This is of particular value when it is desired to set the bottle down for a period.

One of the chief obstacles encountered in the past is to place the device on a milk bottle easily and to remove it easily. This is occasioned by virtue of the fact that the bead 24 on the top of a milk bottle is not of much greater extent than the neck so that very little overhang is provided. In the past it has been necessary to make the hook for completing the circle 14 rather short so that as the device is put in place the hook can be engaged and will still not disengage when strain is placed on the handle 25. In the present instance I have provided the hook portion 26 of considerable extent so as to preclude any possibility of the device being loosened accidentally.

Another feature that has occasioned considerable difficulty is the fact that it was a little difficult to secure both ends of the open circle 14 while applying it to a milk bottle. In my present construction I provide that the loose end of circle 14 be bent upwardly as at 28 until it clears the top of the milk bottle, then to have a D-shaped bend as 30 which will rest on and engage the upper surface of the milk bottle. I have found it most convenient to have the horizontal extent of the D-shaped portion 30 just sufficient so that the finger can nicely be placed on it. Then as an additional means of strengthening this portion of the device I prefer to let the extreme end of the wire extend down the outside of the milk bottle as at 32 in which position it is parallel to the upwardly extending leg 28.

The handle 25 can be made after any of the well known processes, wood has been found very satisfactory, particularly when lacquered, and some of the compositions, wood pulp molded, or preferably laminated paper forms a most excellent handle and one which will readily admit of printing thereon. In this connection it is felt that one of the most outstanding values of this device is the fact that display advertising can be placed on the handle. One form is illustrated in Figure 1. When such display is printed on the handle it should then be preferably clear lacquered over the printing so as to make it impervious to washing and cleaning.

Method of operation

Figure 4:
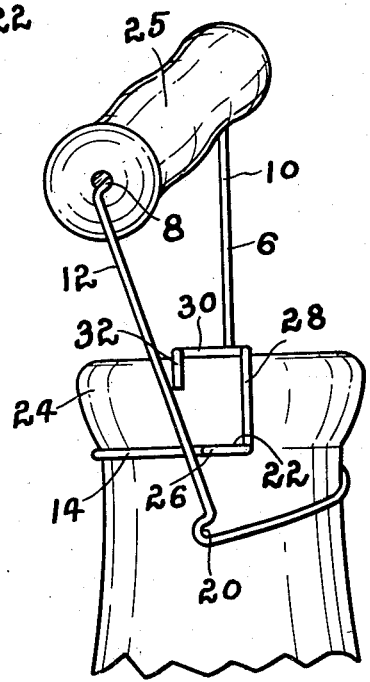
Figure 4 illustrates the method of applying or removing my device.

Assuming that it is desired to place my carrier on a milk bottle the first stage is to apply circle 14 to the milk bottle top with leg 12 disengaged from the hook portion 26. In this way the circle can be very easily slipped over the top of the milk bottle. The D portion 30 will normally come to rest on the top of the milk bottle and the finger or thumb of one hand should be placed thereon to secure it in that position. This holds hook 26 in a fixed position at the proper height for easy engagement with leg 12. The other hand of the operator grasps the handle 25 and presses leg 12 downwardly and twists the handle somewhat after the fashion of Figure 4 to the end that leg 12 will easily clear the tip of hook 26. Then if the handle is allowed to twist back to its normal position and leg 12 is pulled upwardly a very secure interlocking of leg 12 and hook 26 is secured. The final upward movement of leg 12 causes the encircling portion 20 to firmly engage the inner end of the hook portion as at 34. To remove the device a reversal of this operation accomplishes it very easily. As before pressure could be applied to the D-shaped portion 30, the handle 25 operated so as to move leg 12 after showing of Figure 4, and to press it downwardly. In this connection it should be remembered that no abrupt bends are placed in the wire by the placing or removing operation. In other words circle 14 is free to bend thruout its entirety. This is a very desirable feature of my present construction in that it enables me to use a cheap grade of wire for the body 6 and to be forever relieved of any danger of bending the metal further than its elastic limit will allow so that permanent distortion may occur in the same.

The foregoing description and the accompanying drawing are believed to clearly disclose a preferred embodiment of my invention but it will be understood that this disclosure is merely illustrative and that such changes in the invention may be made as are fairly within the scope and spirit of the following claims:

Having thus fully described my invention, what I claim as new and desire to secure by Letters Patent is:—

1. A one piece bottle carrier comprising an inverted U-shaped handle portion and an openable ring, of resilient wire, an outwardly projecting half-loop in the ring to which one leg of the handle portion is hinged, a retaining hook at one end of the ring arranged in the same plane therewith and engaging the other leg of the handle portion, and a D-shaped finger-piece above said hook, projecting inwardly of the ring, disposed to rest on the top of the bottle and hold the ring against downward movement on the bottle neck.

2. A one-piece bottle carrier comprising an inverted U-shaped handle portion and an openable ring, of resilient wire, an outwardly projecting half-loop in the ring to which one leg of the handle portion is hinged and a half-loop formed at the junction of the other leg with the ring, a retaining loop at one end of the ring engaging the second half-loop, and a D-shaped finger-piece above said hook, projecting inwardly of the ring, disposed to rest on the top of the bottle and hold the ring against downward movement on the bottle neck.

3. A one-piece bottle carrier comprising an inverted U-shaped handle portion and an openable ring, of resilient wire, an outwardly projecting half-loop in the ring to which one leg of the handle portion is hinged and a half-loop formed at the junction of the other leg with the ring, one end of the ring being bent upon itself to form a tangentially arranged retaining hook engaging said second leg at its half-loop, an upright member projecting from the hook, and a D-shaped finger piece at the end of said member projecting inwardly of the ring, disposed to rest on the top of the bottle and hold the ring against downward movement on the bottle neck.

DWIGHT O. NELSON.